United States Patent
Dufay et al.

(10) Patent No.: US 10,400,488 B2
(45) Date of Patent: Sep. 3, 2019

(54) LATCHING BOX WITH AN UNLOCKING ACTUATOR HAVING A CYLINDRICAL CAM

(71) Applicant: MESSIER-BUGATTI-DOWTY, Velizy-Villacoublay (FR)

(72) Inventors: Ludovic Dufay, Velizy-Villacoublay (FR); Eric Evenor, Velizy-Villacoublay (FR); Gilbert Lecourtier, Velizy-Villacoublay (FR); Pierre-Yves Liegeois, Velizy-Villacoublay (FR)

(73) Assignee: MESSIER-BUGATTI, Velizy-Villacoubly (FR)

(*) Notice: Subject to any disclaimer, the term of this patent is extended or adjusted under 35 U.S.C. 154(b) by 158 days.

(21) Appl. No.: 13/705,356

(22) Filed: Dec. 5, 2012

(65) Prior Publication Data
US 2013/0147210 A1    Jun. 13, 2013

(30) Foreign Application Priority Data

Dec. 9, 2011 (FR) ..................... 11 61431
Dec. 9, 2011 (FR) ..................... 11 61434

(51) Int. Cl.
*E05C 3/12* (2006.01)
*E05C 3/24* (2006.01)
(Continued)

(52) U.S. Cl.
CPC ............ *E05C 3/12* (2013.01); *B64C 25/30* (2013.01); *E05C 3/24* (2013.01);
(Continued)

(58) Field of Classification Search
CPC ... E05C 3/24; E05C 3/12; B64C 25/30; B64C 2047/0031; B64C 2047/0021;
(Continued)

(56) References Cited

U.S. PATENT DOCUMENTS 4,569,544 A * 2/1986 Escaravage ............ E05B 81/14
                                                292/201
5,450,735 A * 9/1995 Esaki ...................... E05B 5/003
                                                292/204
(Continued)

FOREIGN PATENT DOCUMENTS

DE    10-2007-032779 A1    1/2009

*Primary Examiner* — Kristina R Fulton
*Assistant Examiner* — Faria F Ahmad
(74) *Attorney, Agent, or Firm* — Sughrue Mion, PLLC

(57) ABSTRACT

The invention relates to a latching box for selectively retaining a movable element such as an undercarriage or a hatch in position, the box comprising a body carrying:
- a hook pivotally mounted about a first pivot axis between an engaged position and a disengaged position relative to the movable element;
- a locking member pivotally mounted about a second pivot axis parallel to the first pivot axis to pivot between a position for blocking the hook in the engagement position and a release position for releasing the hook; and
- at least one cam actuator in which the cam co-operates operationally with the locking member to move it towards the release position.

The cam of the actuator is a cylindrical cam mounted to rotate about an axis of rotation orthogonal to the first and second pivot axes.

8 Claims, 2 Drawing Sheets

(51) Int. Cl.
  *B64C 25/30* (2006.01)
  *E05B 15/02* (2006.01)
  *E05B 47/00* (2006.01)
(52) U.S. Cl.
  CPC ... *E05B 2015/026* (2013.01); *E05B 2047/002* (2013.01); *E05B 2047/0013* (2013.01); *E05B 2047/0024* (2013.01); *E05B 2047/0025* (2013.01); *Y10T 292/0947* (2015.04); *Y10T 292/0948* (2015.04); *Y10T 292/108* (2015.04); *Y10T 292/1046* (2015.04); *Y10T 292/1047* (2015.04); *Y10T 292/1077* (2015.04); *Y10T 292/1078* (2015.04); *Y10T 292/1082* (2015.04); *Y10T 292/1092* (2015.04)
(58) Field of Classification Search
  CPC ......... Y10T 292/1047; Y10T 292/1082; Y10T 292/0947; Y10T 292/1046; Y10T 292/0948; Y10T 292/1077; Y10T 292/1078; Y10T 292/108; Y10T 292/1092; E05B 2047/0013; E05B 2047/002; E05B 2047/0024; E05B 2047/003; E05B 2015/026; E05B 2047/0025
  USPC ... 292/98, 99, 200, 201, 210, 215, 216, 280, 292/197, 198, DIG. 23
  See application file for complete search history.

(56) References Cited

U.S. PATENT DOCUMENTS

| | | | | |
|---|---|---|---|---|
| 5,901,991 A * | 5/1999 | Hugel | ............... | G07C 9/00182 292/201 |
| 5,934,717 A * | 8/1999 | Wirths | ............... | E05B 81/14 292/201 |
| 5,938,253 A * | 8/1999 | Szablewski | ............ | E05B 81/14 292/201 |
| 6,076,868 A * | 6/2000 | Roger, Jr. | ............... | E05B 81/14 292/199 |
| 6,338,508 B1 * | 1/2002 | Kleefeldt | ............... | E05B 81/06 292/201 |
| 6,471,259 B1 * | 10/2002 | Weyerstall | ............. | E05B 81/14 292/201 |
| 6,536,814 B2 * | 3/2003 | Kachouh | ............... | E05B 81/14 292/201 |
| 6,565,132 B2 * | 5/2003 | Mork | ..................... | E05B 81/14 292/201 |
| 6,705,649 B1 * | 3/2004 | Reddmann | ............... | E05B 81/06 292/201 |
| 6,719,333 B2 * | 4/2004 | Rice | ...................... | E05B 81/14 292/201 |
| 6,824,177 B1 * | 11/2004 | Nass | ...................... | E05B 81/16 292/201 |
| 7,234,736 B2 * | 6/2007 | Kachouh | ............... | E05B 81/14 292/201 |
| 7,261,333 B2 * | 8/2007 | Tomaszewski | ......... | E05B 81/06 292/201 |
| 7,671,719 B2 * | 3/2010 | Sogo | .................... | G06F 21/31 292/201 |
| 7,883,125 B2 | 2/2011 | Smith, III | | |
| 8,020,903 B2 * | 9/2011 | Graute | ......................... | 292/216 |
| 8,029,031 B2 * | 10/2011 | Hunt | ...................... | E05B 81/06 292/201 |
| 8,061,654 B2 * | 11/2011 | Meyer | ..................... | B64C 25/26 244/102 A |
| 8,328,249 B2 * | 12/2012 | Corrales | ............... | E05B 81/14 292/201 |
| 8,333,414 B2 * | 12/2012 | Takayanagi | ............. | E05B 81/14 292/201 |
| 8,388,029 B2 * | 3/2013 | Pecoul | ................. | E05B 85/243 292/201 |
| 8,474,888 B2 * | 7/2013 | Tomaszewski | ......... | E05B 77/26 292/201 |
| 8,516,864 B2 * | 8/2013 | Greiner | ................. | B62B 3/1404 292/201 |
| 8,517,433 B2 * | 8/2013 | Pritz | ..................... | E05B 83/363 292/201 |
| 8,522,583 B2 * | 9/2013 | Cumbo | ................... | E05B 81/06 292/201 |
| 8,562,033 B2 * | 10/2013 | Tomaszewski | ......... | E05B 85/01 292/201 |
| 8,646,816 B2 * | 2/2014 | Dziurdzia | ........... | E05B 17/0029 292/201 |
| 8,646,817 B2 * | 2/2014 | Tomaszewski | ....... | E05B 15/004 292/201 |
| 8,720,237 B2 * | 5/2014 | Williams | .................. | E05C 3/24 292/200 |
| 8,752,869 B2 * | 6/2014 | Perkins | ................... | E05B 81/06 292/201 |
| 8,757,680 B2 * | 6/2014 | Byun | ..................... | E05B 81/00 292/201 |
| 8,757,681 B2 * | 6/2014 | Graute | ................... | E05B 81/20 292/201 |
| 8,757,682 B2 * | 6/2014 | Scholz | ................... | E05B 81/20 292/201 |
| 9,121,202 B2 * | 9/2015 | Burciaga | ................ | E05B 77/32 |
| 2002/0063430 A1 * | 5/2002 | Amano | ................... | E05B 81/14 292/201 |
| 2002/0096889 A1 * | 7/2002 | Nelsen | ................... | E05B 81/14 292/201 |
| 2003/0020284 A1 * | 1/2003 | Peter | ...................... | B60R 21/38 292/201 |
| 2003/0034655 A1 * | 2/2003 | Mejean | .................. | E05B 81/14 292/201 |
| 2003/0164422 A1 | 9/2003 | Collet et al. | | |
| 2003/0222463 A1 * | 12/2003 | Mejean | .................. | E05B 81/14 292/216 |
| 2004/0056489 A1 * | 3/2004 | Boecker | ................ | E05B 81/14 292/201 |
| 2004/0113438 A1 * | 6/2004 | Kachouh | ............... | E05B 81/14 292/201 |
| 2004/0135378 A1 * | 7/2004 | Buedding | .............. | E05B 81/20 292/216 |
| 2004/0174021 A1 * | 9/2004 | Tensing | ................ | E05B 81/14 292/216 |
| 2004/0201226 A1 * | 10/2004 | Spurr | ..................... | E05B 81/14 292/201 |
| 2005/0134054 A1 * | 6/2005 | Stefanic | ............ | E05B 17/0004 292/201 |
| 2005/0184534 A1 * | 8/2005 | Oberheide | ............. | E05B 81/14 292/201 |
| 2005/0200137 A1 * | 9/2005 | Nelsen | ................... | E05B 81/06 292/201 |
| 2005/0206173 A1 * | 9/2005 | Lim | ....................... | E05B 83/16 292/216 |
| 2006/0049642 A1 * | 3/2006 | Dupont | .................. | E05B 83/36 292/216 |
| 2006/0055178 A1 * | 3/2006 | Graute | ................... | E05B 85/26 292/216 |
| 2006/0076784 A1 * | 4/2006 | Kachouh | ............... | E05B 49/00 292/216 |
| 2006/0131893 A1 * | 6/2006 | Tomaszewski | ......... | E05B 81/06 292/216 |
| 2006/0226661 A1 * | 10/2006 | Moore | .................... | E05B 81/20 292/216 |
| 2006/0267350 A1 * | 11/2006 | Ichinose | ................ | E05B 81/14 292/201 |
| 2006/0284425 A1 * | 12/2006 | Torka | ..................... | E05B 81/20 292/201 |
| 2007/0158954 A1 * | 7/2007 | Warmke | ................. | E05B 81/06 292/201 |
| 2007/0182165 A1 * | 8/2007 | Yoshikuwa | ............ | E05B 83/36 292/216 |
| 2007/0257496 A1 * | 11/2007 | Spurr | ................. | E05B 17/0037 292/57 |
| 2008/0157545 A1 * | 7/2008 | Parent | .................... | E05B 81/14 292/216 |

(56) References Cited

U.S. PATENT DOCUMENTS

| | | | |
|---|---|---|---|
| 2008/0217928 A1* | 9/2008 | Spurr | E05B 81/20 292/198 |
| 2008/0224482 A1* | 9/2008 | Cumbo | E05B 77/02 292/216 |
| 2009/0071207 A1* | 3/2009 | Meyer | B64C 25/26 70/262 |
| 2009/0284025 A1* | 11/2009 | Salcombe | B64C 25/26 292/201 |
| 2010/0244466 A1* | 9/2010 | Tomaszewski | E05B 77/26 292/201 |
| 2010/0253095 A1* | 10/2010 | Bendel | E05B 81/14 292/200 |
| 2011/0187132 A1* | 8/2011 | Scholz | E05B 81/20 292/226 |
| 2011/0204673 A1* | 8/2011 | Cumbo | E05B 81/06 296/146.1 |
| 2011/0214460 A1* | 9/2011 | Byun | E05B 81/00 70/91 |
| 2011/0304162 A1* | 12/2011 | Dow | E05B 77/30 292/226 |
| 2011/0316293 A1* | 12/2011 | Luschper | E05B 79/20 292/195 |
| 2012/0175896 A1* | 7/2012 | Martinez | E05B 81/06 292/199 |
| 2013/0147210 A1* | 6/2013 | Dufay | E05C 3/12 292/98 |
| 2014/0091581 A1* | 4/2014 | Taurasi | E05B 15/04 292/215 |

* cited by examiner

LATCHING BOX WITH AN UNLOCKING ACTUATOR HAVING A CYLINDRICAL CAM

The invention relates to a latching box for retaining undercarriages when they are in the retracted position in their bays, or for retaining wheel-bay hatches in the closed position.

TECHNOLOGICAL BACKGROUND

Document U.S. Pat. No. 7,883,125 discloses latching boxes for selectively holding in position a movable element such as an undercarriage or a hatch, each box comprising a hook mounted to move between an engaged position and a disengaged position relative to the movable element, a locking member that is movable between a position for blocking the hook in the engaged position and a release position for releasing the hook, and two actuators, including a cam actuator in which the cam co-operates with the locking member in order to move it towards the release position.

In that document, the hook, the locking member, and the cam are all mounted to pivot about axes that are parallel. The use of a rotary cam serves to simplify the control of the actuator, since the actuator can be reset by causing the cam to rotate through one complete revolution. Thus, in order to control the actuator, it suffices to switch on its motor until a position sensor indicates that one complete revolution has been performed.

Nevertheless, in those arrangements, the emergency actuator with a cam projects from one of the faces of the box and thus increases its overall size considerably.

OBJECT OF THE INVENTION

An object of the invention is to provide a latching box with a cam actuator, the box being of small size.

SUMMARY OF THE INVENTION

To this end, the invention provides a latching box for selectively retaining a movable element such as an undercarriage or a hatch in position, the box comprising a body carrying:
- a hook pivotally mounted about a first pivot axis between an engaged position and a disengaged position relative to the movable element;
- a locking member pivotally mounted about a second pivot axis parallel to the first pivot axis to pivot between a position for blocking the hook in the engagement position and a release position for releasing the hook; and
- at least one cam actuator in which the cam co-operates operationally with the locking member to move it towards the release position.

According to the invention, the cam of the actuator is a cylindrical cam rotatable about an axis of rotation orthogonal to the first and second pivot axes.

Thus, the actuator can lie along a body of the latching box or can be arranged to project from a peripheral edge thereof, thereby considerably reducing the overall size of the latching box.

BRIEF DESCRIPTION OF THE FIGURES

The invention can be better understood in the light of the following description of a particular embodiment of the invention, given with reference to the figures of the accompanying drawings, in which.

DETAILED DESCRIPTION OF AN EMBODIMENT

Figure 1:
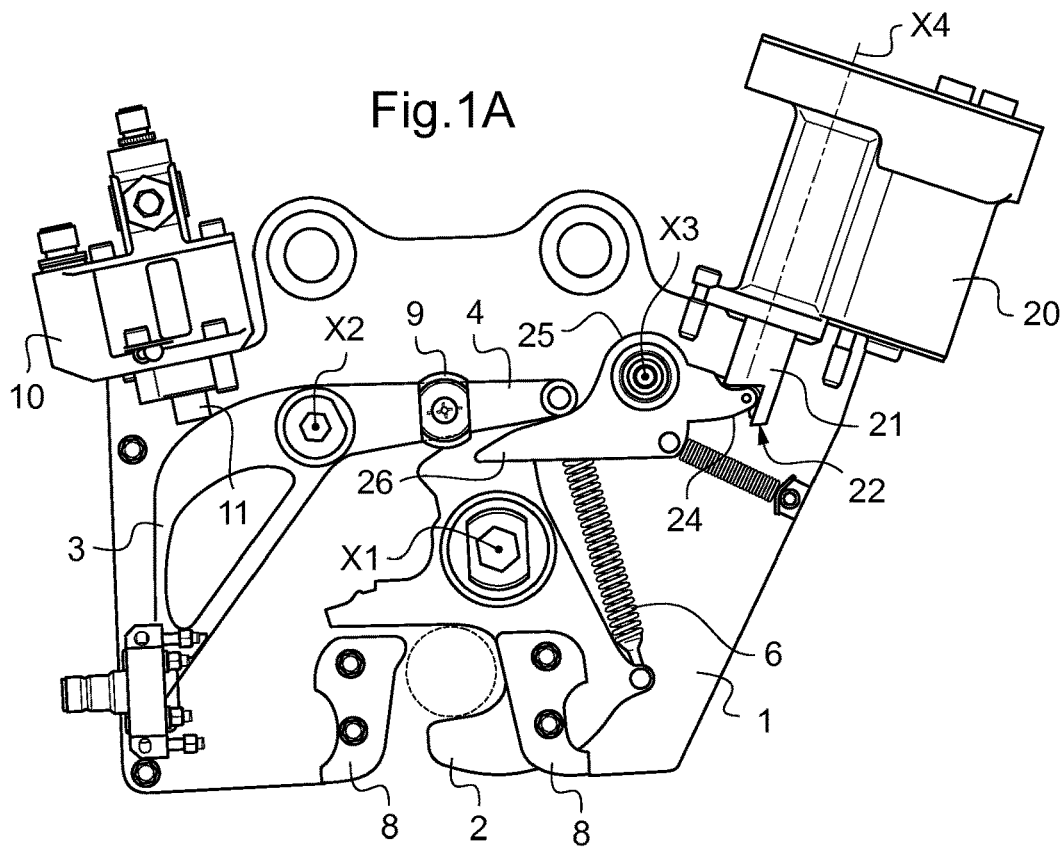
FIGS. 1A and 1B are outside views of a latching box of the invention, the hook being in the engagement position in FIG. 1A and in the disengaged position in FIG. 1B, the top plate of the body of the box being omitted to make the mechanism easier to understand.

With reference to FIGS. 1A and 1B, the latching box of the invention comprises a body defined by a bottom plate 1 and a top plate that is identical to the bottom plate but that is omitted from the figures for greater clarity. It should naturally be understood that the body of the box is relatively flat, its thickness being defined by the thickness between the plates.

Between the two plates, a hook 2 is mounted to pivot about a pivot axis X1 between an engaged position shown in FIG. 1A in which the hook engages a roller (dashed lines) secured to a movable element that is to be held in position, and a disengaged position shown in FIG. 1B in which the roller is released. In the figures, there can be seen guides 8 that serve to guide the roller along its path (shown by the arrow).

In known manner, the hook 2 is moved into the engaged position by the roller which pushes back the hook 2. The hook 2 is held locked in the engaged position by a locking lever 3 that is likewise pivotally mounted between the plates, about a pivot axis X2 parallel to the pivot axis X1 of the hook 2. The locking lever 3 has an arm 4 carrying a wheel 9 that co-operates with an appendix 5 of the hook 2 that is urged to bear against the wheel 9 by a spring 6 coupled between the hook 2 and the locking lever 3. In FIG. 1A, the locking lever 3 is in the locking position, while in FIG. 1B, the locking lever 3 is in the release position.

A main unlocking actuator 10 is arranged on the body of the box to act on the locking lever 3 to cause it to pivot from the locking position to the release position. For this purpose, the main unlocking actuator 10 has a telescopic rod 11 that projects from the actuator to push back the locking member. The main unlocking actuator 10 in this example projects from a peripheral edge of the body of the box, the rod 11 being engaged between the plates.

An emergency unlocking actuator 20 is provided to be capable of unlocking the hook 2 in the event of the main unlocking actuator 10 failing. The emergency unlocking actuator 20 is an actuator having a rotary cam 21. In this example, and according to the invention, the cam 21 is a bell-shaped cylindrical cam having a terminal edge 22 that defines a helical ramp adapted to co-operate with a first arm 24 of a rocker 25 that is pivotally mounted on the plate 1 about a pivot axis X3 parallel to the pivot axis X2 of the locking member. The rocker 25 has a second arm 26 that co-operates with the locking member 3 to push it back and thereby release the hook 2 when the rocker 25 is constrained to pivot under the effect of the cylindrical cam 21 rotating.

According to an important aspect of the invention, the cam 21 is mounted to rotate about an axis of rotation X4 that is orthogonal to the pivot axis X2 of the locking member 3.

Figure 2:
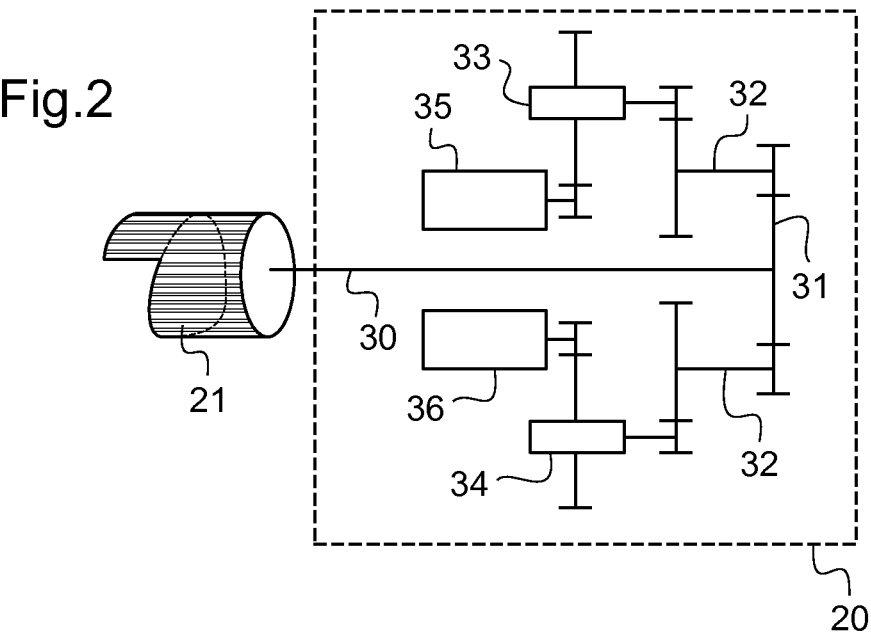
FIG. 2 is a diagram showing the operation of the emergency unlocking actuator fitted on the latching box of FIG. 1.

As can be seen more clearly in FIG. 2, the cam 21 is secured to a shaft 30 that carries a wheel 31 co-operating with stepdown gearing 32, itself engaged by two freewheels 33 and 34. The freewheels 33 and 34 have rings that engage outlet pinions of two electric motors 35 and 36. The use of two freewheels enables the shaft 30 to be driven by either one of the motors, even if the other motor has failed and/or is blocked. Naturally, it is appropriate for the freewheels to be mounted to be free to rotate in the same direction of rotation. In FIG. 2, it can be seen that the stepdown gearing 32 is shown duplicated for greater clarity, whereas in the embodiment shown in FIG. 3 the stepdown gearing is not duplicated.

Figure 3:
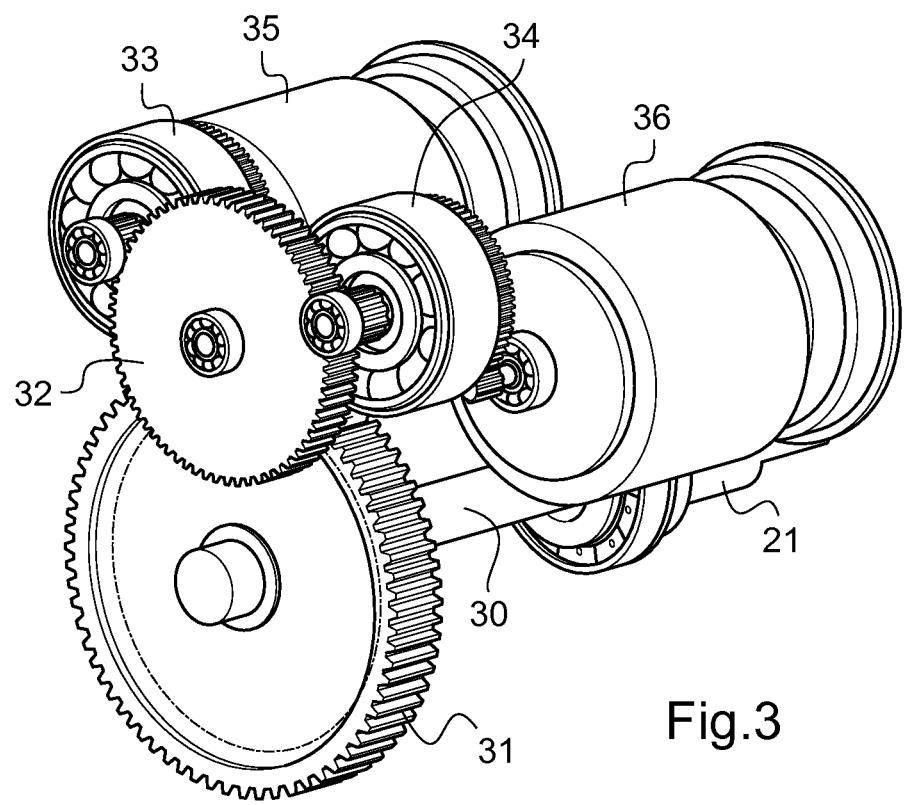
FIG. 3 is an inside view of the arrangement of the components of the emergency unlocking actuator of FIG. 2.

In the arrangement shown in FIG. 3, it can be seen that the two motors are close to each other. The freewheels 33 and 34 are close together. In this example the actuator is symmetrical about a plane containing the axis rotation of the shaft 30 and of the gearing 32. As can be seen in the figure, all of the rotary elements of the actuator rotate about axes that are parallel. It can also be seen that the motors lie parallel beside the shaft 30 of the cam 21, thereby leading to an arrangement that is particularly compact.

As can be seen in FIGS. 1A and 1B, the emergency unlocking actuator 20 is arranged on the body of the box to project from a peripheral edge thereof so that the thickness of the latching box is particularly small. Naturally, the emergency unlocking actuator 20 can be reset by causing the cylindrical cam 21 to turn through one complete revolution. The actuator 20 may be controlled in very simple manner by powering one or the other of its motors 35 and 36 until the cam has turned through one complete revolution, which makes it possible to identify its position with the help of a simple angular position sensor, e.g. arranged on the shaft 30 carrying the cam 31.

Naturally, the invention is not limited to the above description, but on the contrary covers any variant coming within the ambit defined by the claims.

In particular, although the cylindrical cam 21 engages the locking member 3 via a rocker 25, thus making it possible to increase the movement imposed by the cylindrical cam 21, it is naturally possible to cause the locking member 3 to be engaged directly by the cam, or indeed to interpose a pusher between the cam and the locking member. Under all circumstances, the cam co-operates operationally with the locking member either by direct contact or else by interposing an intermediate element.

Although the cam in this example is carried by the emergency unlocking actuator, it could naturally be fitted to a main unlocking actuator that is a rotary actuator.

Although the cam actuator shown is of the type having two converging channels with two motors associated with the cam shaft via freewheels, it would naturally be possible to actuate the cam by means of any other device, e.g. an actuator having two segregated channels, or indeed an actuator having a single channel, if it is deemed to be sufficiently reliable.

What is claimed is:

1. A latching box for selectively retaining a movable element, comprising at least an undercarriage or a hatch, in position, the box comprising a body carrying:
  a hook pivotally mounted about a first pivot axis between an engaged position and a disengaged position relative to the movable element, the first pivot axis lying in a first plane;
  a locking member pivotally mounted about a second pivot axis parallel to the first pivot axis to pivot between a position for blocking the hook in the engagement position and a release position for releasing the hook, the second pivot axis lying in a second plane that is parallel to the first plane; and
  at least one cam actuator having a cam that co-operates operationally with the locking member to move it towards the release position;
  wherein the cam of the at least one actuator is a cylindrical cam comprising an eccentric part and being rotatable about an axis of rotation which lies in a third plane that is orthogonal to both the first and second planes that include the first and second pivot axes, respectively,
  wherein when the locking member is in the position for blocking the hook in the engagement position, only one single complete revolution of the cylindrical cam about the axis of rotation lying in the third plane causes:
  the locking member pivoting to the release position, and thereafter, the locking member returning to the position for blocking the hook in the engagement position.

2. The latching box according to claim 1, wherein the cylindrical cam co-operates with a first arm of a rocker pivotally mounted on the box about a third pivot axis parallel to the first and second pivot axes, the rocker having a second arm co-operating with said locking member to push the locking member back when the cam is rotated.

3. The latching box according to claim 1, wherein the actuator includes, in addition to the cylindrical cam, a plurality of rotary elements including at least one motor, said rotary elements all rotating about axes of rotation parallel to the axis of the cam.

4. The latching box according to claim 3, wherein the actuator has two freewheels linked in rotation with a shaft carrying the cam, the freewheels being driven by respective electric motors.

5. The latching box according to claim 4, wherein the shaft includes a toothed wheel engaged by a stepdown gearing, which itself is engaged by the freewheels.

6. The latching box according to claim 1, wherein the cam of the at least one cam actuator co-operates operationally with the locking member without worm-worm wheel coupling to move it towards the release position.

7. The latching box according to claim 1, wherein the cam is a bell-shaped cylindrical cam.

8. The latching box according to claim 1, wherein the cam has a terminal edge that defines a helical ramp.

\* \* \* \* \*